US008812488B2

(12) United States Patent
Bamba et al.

(10) Patent No.: US 8,812,488 B2
(45) Date of Patent: Aug. 19, 2014

(54) CONSTRUCTING MULTIDIMENSIONAL HISTOGRAMS FOR COMPLEX SPATIAL GEOMETRY OBJECTS

(75) Inventors: Bhuvan Bamba, San Francisco, CA (US); Richard J. Anderson, Nashua, NH (US); Ying Hu, Hollis, NH (US); Siva Ravada, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/587,897

(22) Filed: Aug. 16, 2012

(65) Prior Publication Data

US 2014/0052711 A1 Feb. 20, 2014

(51) Int. Cl.
*G06F 17/30* (2006.01)

(52) U.S. Cl.
USPC ........... 707/718; 707/713; 707/736; 707/758; 706/12; 706/14; 706/45

(58) Field of Classification Search
None
See application file for complete search history.

(56) References Cited

U.S. PATENT DOCUMENTS

| | | | |
|---|---|---|---|
| 5,359,724 A | 10/1994 | Earle | |
| 5,848,408 A | 12/1998 | Jackobsson | |
| 6,317,750 B1 | 11/2001 | Tortolani et al. | |
| 6,385,604 B1 | 5/2002 | Bakalash et al. | |
| 6,397,195 B1 | 5/2002 | Pinard et al. | |
| 6,405,208 B1 | 6/2002 | Raghavan et al. | |
| 6,460,045 B1 * | 10/2002 | Aboulnaga et al. | 1/1 |
| 6,484,179 B1 | 11/2002 | Roccaforte | |
| 6,959,304 B1 * | 10/2005 | Teig et al. | 707/713 |
| 7,028,046 B2 | 4/2006 | Anjur et al. | |
| 7,324,991 B1 | 1/2008 | Anjur | |
| 7,337,163 B1 | 2/2008 | Srinivasan | |
| 7,366,730 B2 | 4/2008 | Greenfield et al. | |
| 7,467,127 B1 | 12/2008 | Baccash et al. | |
| 7,617,312 B2 | 11/2009 | Tummalapalli | |
| 7,725,425 B2 * | 5/2010 | Smartt | 707/770 |
| 7,734,652 B2 | 6/2010 | Tamayo | |
| 7,769,733 B2 * | 8/2010 | Chen et al. | 707/702 |
| 7,774,303 B2 | 8/2010 | Shoup | |
| 7,797,320 B2 | 9/2010 | Thomsen | |

(Continued)

OTHER PUBLICATIONS

Aoki, Paul M., "How to Avoid Building DataBlades That Know the Value of Everything and the Cost of Nothing", dated 1999, 12 pages.

(Continued)

*Primary Examiner* — Hung Le
(74) *Attorney, Agent, or Firm* — Hickman Palermo Truong Becker Bingham Wong LLP; Karl T. Rees

(57) ABSTRACT

Techniques are described for generating histograms for a multidimensional space. In the presence of large spatial objects, fuzzy splitting techniques are utilized to recursively divide the multidimensional space into partitions, where a single spatial object may belong to multiple partitions. Large spatial objects are essentially broken down into smaller objects that may allow for more efficient partitioning of the multidimensional space. A count of spatial objects in each partition yields a spatial histogram. A spatial object that belongs to multiple partitions may have a weighted count for each of the multiple partitions, based on the extent to which the spatial object overlaps with each partition. Thus, an object that is split among a handful of partitions will only contribute a fraction of a count to each partition. Small partitions having relatively few objects are avoided by refusing to subdivide a partition whose members drop below a threshold number.

22 Claims, 8 Drawing Sheets

(56) References Cited

U.S. PATENT DOCUMENTS

| | | | |
|---|---|---|---|
| 8,001,112 | B2 | 8/2011 | Dombroski et al. |
| 8,200,612 | B2 | 6/2012 | Soylemez |
| 8,209,208 | B2 | 6/2012 | Lipasek et al. |
| 2005/0033741 | A1 | 2/2005 | Dombroski et al. |
| 2006/0184519 | A1* | 8/2006 | Smartt ............... 707/3 |
| 2011/0145244 | A1* | 6/2011 | Kim et al. ............ 707/737 |
| 2013/0060547 | A1* | 3/2013 | Beran et al. .......... 703/7 |
| 2014/0052711 | A1 | 2/2014 | Bamba et al. |

OTHER PUBLICATIONS

Acharya, S. et al., "Selectivity Estimation in Spatial Databases" *SIGMOD* 1999 (12 pages).
Beckmann N. et al., "The R*-tree: An Efficient and Robust Access Method for Points and Rectangles+" *1990 ACM* (10 pages).
Bentley, J., "Multidimensional Binary Search Trees Used for Associative Searching" *1975 ACM Student Award* (9 pages).
Eberhardt, H. et al., "Density Trees for Efficient Nonlinear State Estimation," *Proceedings of the 13th International Conference on Information Fusion,* Edinburgh, United Kingdom, Jul. 2010 (8 pages). (8 pages)—Need Year.
Guttman, A., "R-Trees: A Dynamic Index Structure for Spatial Searching" 1984 *ACM* (11 pages).
Samet, H. et al., "Storing a Collection of Polygons Using Quadtrees" *ACM Transactions on Graphics,* Jul. 3, 1985 (41 pages).
Wald, I. et al., On building fast kd-Trees for Ray Tracing, and on doing that in O (N log N) *IEEE Symposium on Interactive Ray Tracing* 2006 (9 pages).

* cited by examiner

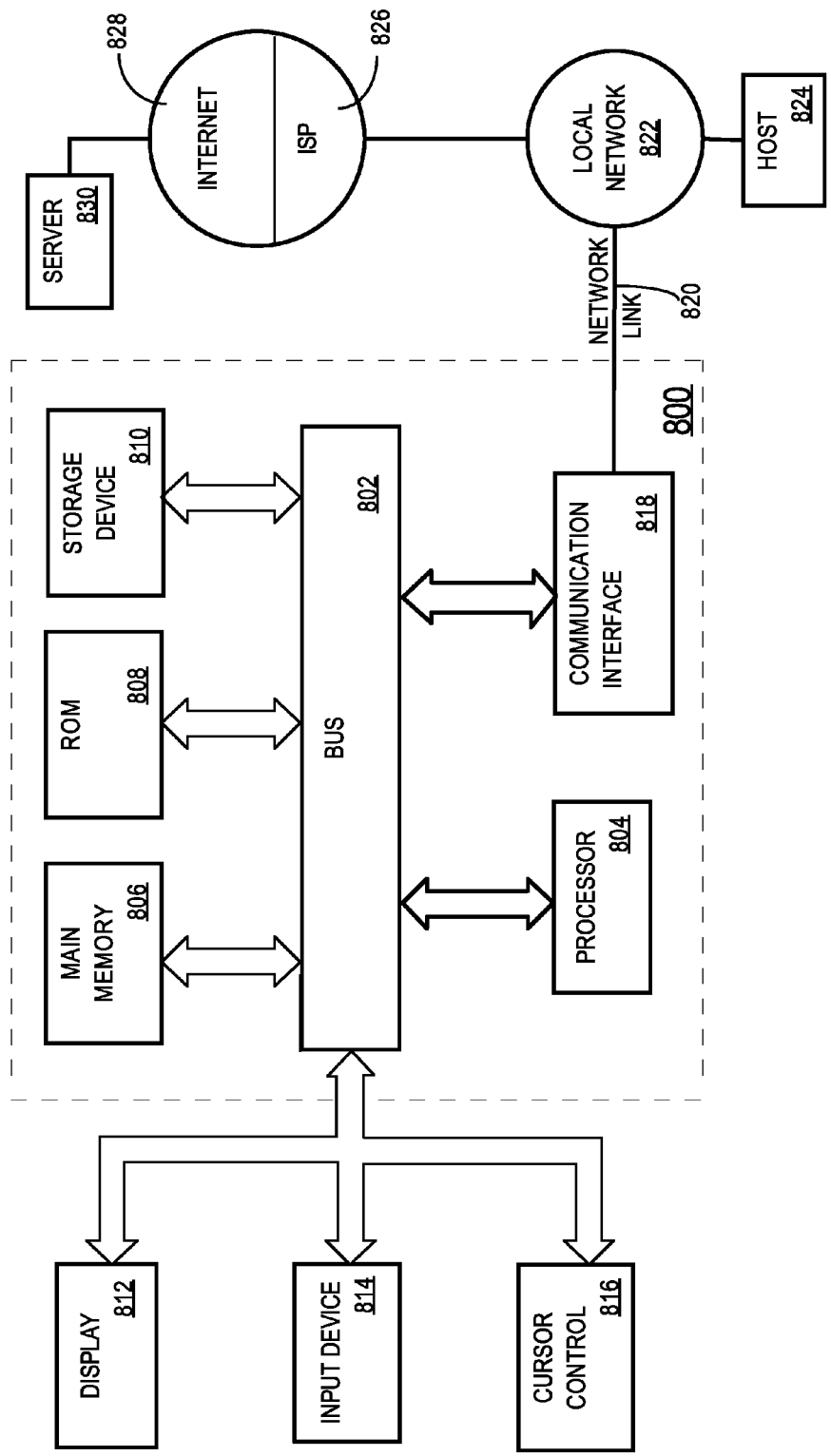

CONSTRUCTING MULTIDIMENSIONAL HISTOGRAMS FOR COMPLEX SPATIAL GEOMETRY OBJECTS

TECHNICAL FIELD

Embodiments relate generally to spatial data, and, more specifically, to techniques for constructing multidimensional histograms for spatial geometry objects.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Spatial Data

A spatial object is an object that has defined shape, size, and position in a multidimensional space. Spatial objects may reside in multi-dimensional spaces having any number of dimensions. For example, points, lines, and polygons are common types of spatial objects in two-dimensional spaces, while cubes and spheres are common types of spatial objects in three-dimensional spaces. The portion of a multidimensional space in which a spatial object exists is known as the "extent" of the spatial object. For example, the area inside of a square would be the "extent" of the square. One common type of spatial data is geographic data, such as used in geographic information systems ("GIS").

A common manner of representing a spatial object within its multidimensional space is to specify the boundaries of the spatial object's extent in terms of a series of coordinates known as vertices. Each successive pair of vertices in the series is a vector that forms the edge of the object. In this manner, spatial objects of arbitrary complexity may be represented, from simple shapes such as triangles and squares, to complex shapes such as territorial borders and roads. Other manners of representation also exist, such as equations, bitmaps, and hybrid approaches. For convenience throughout this disclosure, a spatial object shall hereinafter be synonymous with its representation.

A spatial database system is a database system configured to provide functionality that has been optimized for storing and/or querying spatial objects. For example, many spatial database systems are configured to support functionality prescribed by the "Simple Feature Access" standard known as ISO 19125. One common feature supported by spatial database systems is the ability to execute "spatial predicates." A spatial predicate is, in essence, a true/false query whose outcome is conditioned upon the spatial relationship between two extents. Among other uses, spatial predicates may be used in conjunction with traditional query statements, such as within the WHERE clause of a SELECT statement in the structured query language ("SQL"), to identify all spatial objects that meet certain criteria. For example, using spatial predicates, a user might request that a spatial database system identify all roads within twenty miles of a geographic coordinate. Another common feature of spatial database systems is the ability to construct spatial indexes. A variety of types of spatial indexes exists. One such spatial index is an R-tree, which groups objects by areas.

A spatial database system need not be exclusively devoted to spatial data. For example, relational database systems may be used to store both spatial data and non-spatial data. One way of supporting spatial data in a relational database system is to mark certain tables as storing spatial data. Spatial data may be stored in tables using any suitable form. For instance, each row of a table may be a different spatial object, having one or more columns whose values specify the extent of the spatial object. A variety of other techniques exists for storing spatial data, including without limitation other relational database techniques as well as techniques involving databases dedicated entirely to spatial data.

Spatial Histograms

It is often useful for a spatial database system to construct a "histogram" of the distribution of a set of spatial objects relative to defined partitions of a multidimensional space. The histogram defines the boundaries of each partition, as well as an object count associated with each partition. Among many purposes, a histogram may allow a database user to better visualize certain aspects of the set of spatial objects.

A histogram may also be used to estimate the selectivity of spatial queries against sets of spatial data, such as tables. For example, when deciding the most optimal query plan for executing a spatial query, a query optimizer will often make determinations that are conditioned upon how many objects in a table are estimated to fall within a target area of a multiple dimensional space. Such determinations may include, for instance, whether to use an index or perform a table scan when executing a spatial predicate, a join order for multiple tables, and so forth. The query optimizer may quickly arrive at such an estimate using a function of the object counts associated with partitions in the histogram that overlap with the target area.

Depending on the embodiment, the object counts in a histogram need not necessarily reflect the distributions of the actual extents of the spatial objects. For example, since it is computationally expensive to determine whether the extent of a spatial object is actually within a partition, histograms are often based on the distributions of simplified bounding geometries for the spatial objects rather than the actual extents of those spatial objects. One type of bounding geometry is a "bounding box," expressed solely in terms of minimum and maximum values for each dimension of the multidimensional space, that entirely encloses the extent of a spatial object. A minimum bounding geometry is a smallest size bounding geometry of a particular shape or structure that is capable of enclosing the extent of a spatial object. In two-dimensional spaces, a minimum bounding rectangle is frequently used. A minimum bounding rectangle is an expression of the minimum and maximum values for the x and y coordinates of a two-dimensional object in its two-dimensional coordinate system (e.g. min(x), max(x), min(y), max(y)). The use of bounding geometries to approximate the extent of an object when constructing a histogram can reduce the amount of time necessary to construct a histogram while still producing estimated object counts of reasonable utility.

A common technique for constructing histograms for a set of spatial objects involves recursively dividing a multi-dimensional space into partitions. An initial partition is defined. For example, the initial partition may be a minimum bounding box for the entire set of spatial objects (or their bounding geometries). The partition is then "divided" into two or more new partitions. The new partitions may then themselves be divided into yet additional partitions. The process repeats recursively on each newly created partition until some terminal condition is reached, such as the creation of a target number of partitions.

Various heuristics may be used at each recursion to determine how to divide a partition into new partitions. Two of the different heuristics are "equi-area" and "equi-count." Both heuristics involve splitting the partition into "sides," such as left and right halves. The "equi-area" heuristic splits the partition into two or more "sides" of approximately equal area. The "equi-count" heuristic divides the partition into two or more "sides" having approximately equal numbers of spatial objects. In either case, spatial objects are then assigned to their respective "sides" based upon the location of their mid-point (or the mid-point of their bounding geometry). A minimum bounding geometry is identified for the spatial objects (or bounding geometries thereof) on each "side." This minimum bounding rectangle then becomes a new partition, which may itself be divided. Both heuristics are described in "Selectivity Estimation in Spatial Databases" by Swarup Acharya et al., SIGMOD '99 Philadelphia Pa., the entire contents of which are hereby incorporated by reference for all purposes as if set forth herein.

Unfortunately, when conventional heuristics are applied to data sets containing complex spatial objects with large spatial extents, low utility histograms with poor selectivity estimation can result. One problem may be the creation of very large partitions. FIG. 1 is a block diagram 100 that illustrates how large partitions can result from equi-area or equi-count techniques. Initial partition 110, as illustrated by dashed lines in block 101, comprises objects 111-117, of which object 113 is significantly large, and in fact fills the entire width of partition 110. According to some equi-area and equi-count heuristics, the objects in initial partition 110 may be divided into two "sides," along a vertical line between objects 115 and 116. Depending on the heuristic—in particular depending on the "side" in which object 113 is placed—two different sets of partitions may result from such a split of partition 110. If object 113 is placed on the right "side," then as depicted in block 120, partitions 121 and 122 result, with object 113 residing in partition 122. If object 113 is placed on the left "side," then as depicted in block 130, partitions 131 and 132 result, with object 113 residing in partition 131. In either case, both partitions 122 and 131 are as large (or almost as large) as the original bucket. This is because the partition in which object 113 resides must be able to entirely enclose object 113. Moreover, it is impossible to further subdivide partitions 122 and 131 using conventional heuristics. This problem can be particularly significant if partition 110 contains many more items, as is likely to be the case in some embodiments.

Another problem resulting from the above heuristics may be the creation of buckets with too few data objects. FIG. 2 is a block diagram 200 that illustrates how low-count partitions can result from equi-area techniques. As illustrated in block 201, initial partition 210 comprises objects 211 to 215, of which object 213 is significantly large, and in fact fills the entire width of partition 210. Two different splits are possible according to some equi-area heuristics, depending on the "side" in which object 213 is placed. The bottom left block 220 shows that no split occurs if 213 is assigned to the left side, leaving only the original partition 210. In the other case, as illustrated in block 230, partitions 231 and 232 are created, with partition 231 comprising objects 211, 212, 214, and 215, and partition 232 comprising only object 213.

BRIEF DESCRIPTION OF THE DRAWINGS

The present invention is illustrated by way of example, and not by way of limitation, in the figures of the accompanying drawings and in which like reference numerals refer to similar elements and in which:

FIG. 8 is a block diagram of a computer system upon which embodiments of the invention may be implemented.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
    1.0. General Overview
    2.0. Structural Overview
    3.0. Functional Overview
    4.0. Implementation Examples
        4.1. Partitioning with SubObjects
        4.2. Example Equi-Area Partitioning
        4.3. Example Equi-Count Partitioning
        4.4. Example Detailed Process Flow
        4.5. Database-specific Implementation Example
    5.0. Implementation Mechanism—Hardware Overview
    6.0. Extensions and Alternatives 1.0. General Overview Approaches, techniques, and mechanisms are disclosed for constructing histograms for spatial data using "fuzzy" splitting and other techniques. According to an embodiment, in the presence of large spatial objects, fuzzy splitting techniques are utilized to recursively divide a multidimensional space into partitions, wherein a single spatial object may belong to multiple partitions. Large spatial objects are essentially broken down into smaller objects that, depending on the embodiment, allow for more efficient partitioning of the multidimensional space. A count of spatial objects in each partition yields a spatial histogram.

In an embodiment, a spatial object that belongs to multiple partitions may also have a weighted count for each of the multiple partitions, based on the extent to which the spatial object overlaps with each partition. Thus, an object that is split among a handful of partitions will only contribute a fraction of a count to each of the partitions.

In an embodiment, when recursively dividing the multidimensional space into partitions, partitions whose members drop in count below a threshold number are not subdivided, thus avoiding the creation of small partitions having relatively few objects.

In other aspects, the invention encompasses methods, computer apparatuses, and computer-readable medium configured to carry out the foregoing techniques.

2.0. Structural Overview

Figure 1:
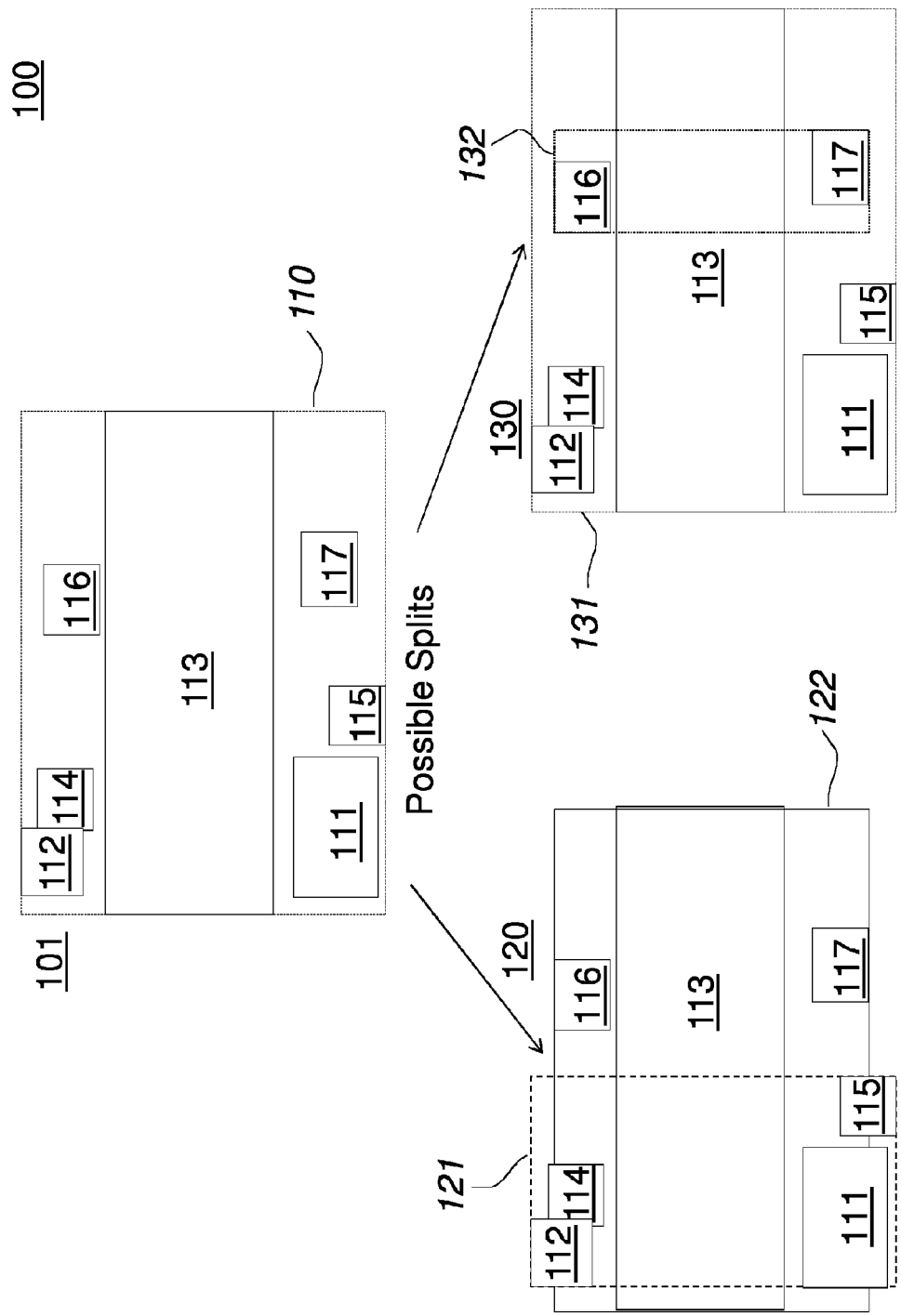
FIG. 1 is a block diagram that illustrates how large partitions can result from equi-area or equi-count techniques.
Figure 2:
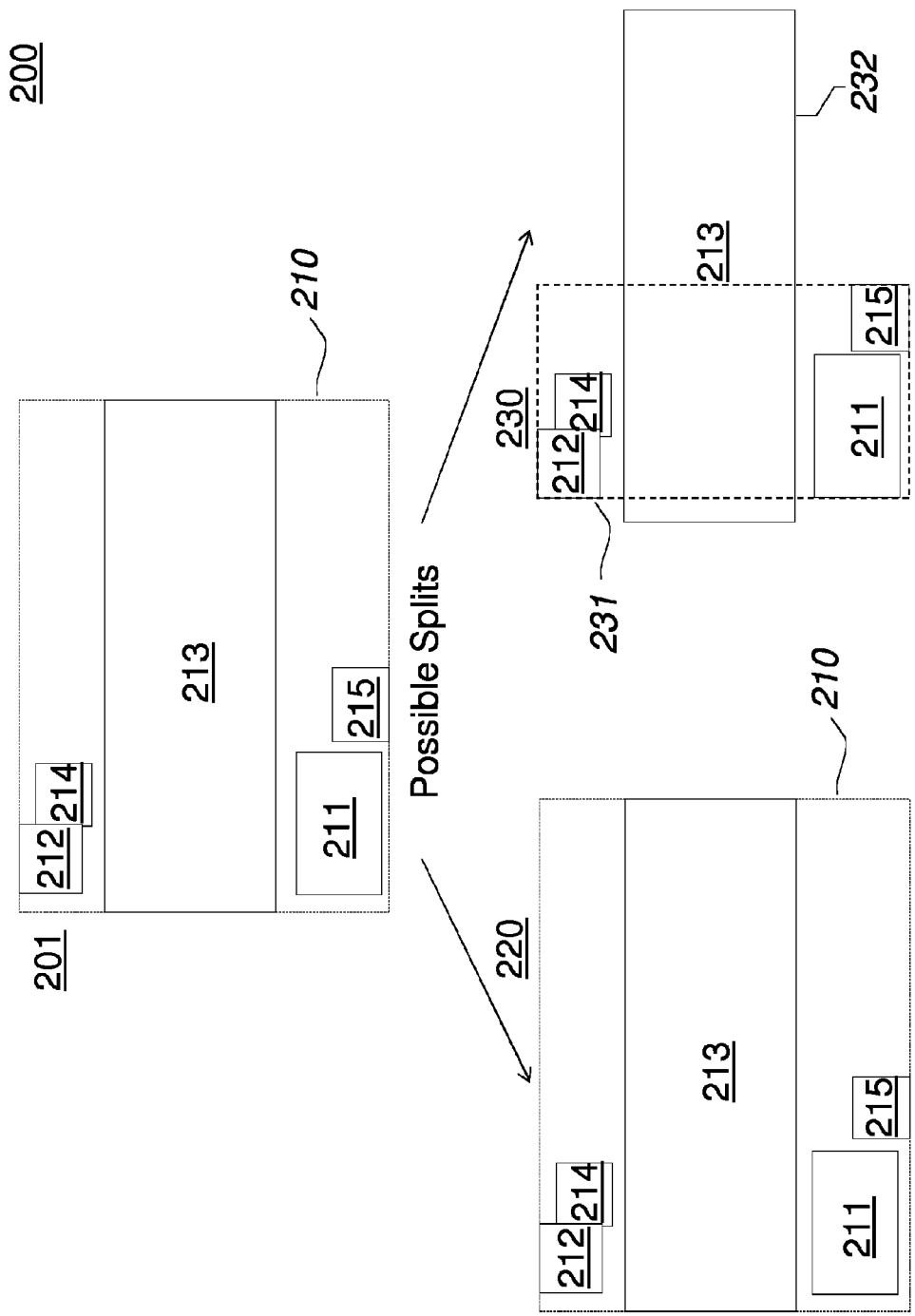
FIG. 2 is a block diagram that illustrates how low-count partitions can result from equi-area techniques.
Figure 3:
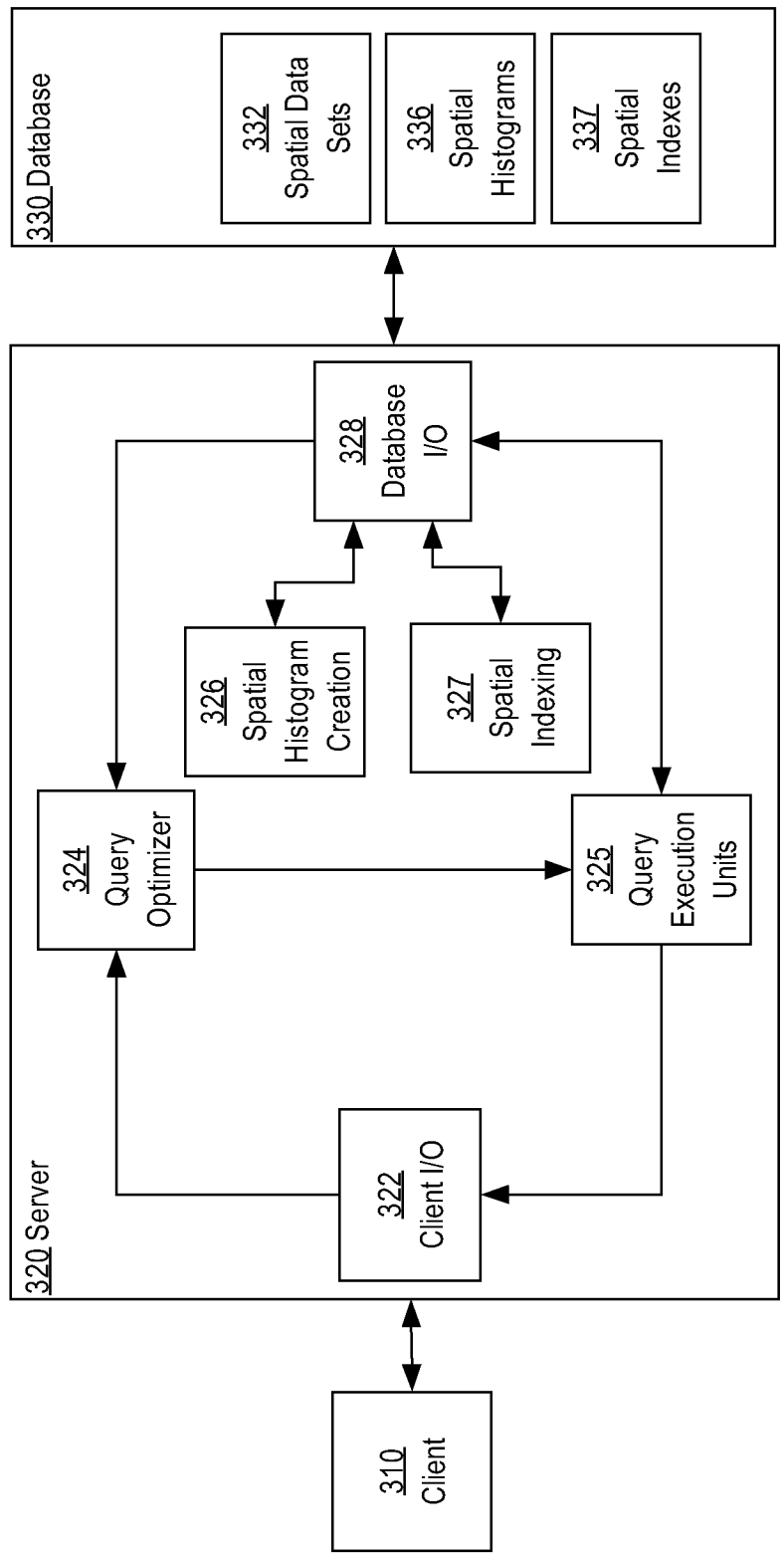
FIG. 3 is a block diagram that illustrates an example system in which the techniques described herein may be practiced.

FIG. 3 is a block diagram that illustrates an example system 300 in which the techniques described herein may be practiced, according to an embodiment. System 300 comprises a client 310, server 320, and database 330. Depending on the embodiment, system 300 may include additional clients. For example, client 310 may be one of many clients configured to interact with server 320. Depending on the embodiment, system 300 may further include additional servers and/or databases. For example, server 320 may be part of a multi-node system, and database 330 may be one of many copies of a database. System 300 is but one example of a system in which the techniques described herein may be practiced. Other systems for practicing the techniques described herein may include fewer or additional components, in varying arrangements.

Client 310 may be any application or component that relies upon data from database 330. For example, client 310 may be a web application or other database application that issues database commands to server 320 to retrieve or manipulate data from database 330. Client 310 may communicate with server 320, for example, over a network or by procedure calls. Client 310 may send requests to server 320 using any suitable protocol(s), including without limitation SQL, XQuery, Java, and so forth.

Server 320 comprises a client input/output ("I/O") component 322, a query optimizer 324, one or more query execution units 325, a spatial histogram creation component 326, a spatial indexing component 327, and a database I/O component 328. Though not depicted, server 320 may further include any of a variety of additional components. For example, server 320 may comprise any conventional relational database component and/or logic. Server 320 may further or separately include additional components optimized to provide spatial database features, including without limitation, conventional GIS components.

Client input/output ("I/O") component 322 receives requests from client 310 and sends responses to those requests once the responses have been formulated by execution of a query execution unit 325. Query optimizer 324 analyzes database requests, such as received from client 310, and constructs and/or identifies a query execution unit 325 capable of executing the request. Query optimizer 324 may do so using any of a variety of conventional query optimization techniques. Query optimizer 324 may utilize one or more of spatial indexes 337 and/or spatial histograms 336 when identifying a query execution unit 325 to execute requests involving a spatial data set 332. Query execution units 325 are software components such as query execution plans whereby database requests, such as those received from client 310, may be executed. Responsive to instructions from other components of server 320, database I/O component 328 sends I/O requests to, and receives responding data from, database 330.

Spatial histogram creation component 326 is a component configured to generate spatial histograms, such as one or more spatial histograms 336, from spatial data sets, such as spatial data sets 332, in accordance with the techniques described herein. Since spatial histograms can be relatively expensive to compute, in some embodiments spatial histogram creation component 326 may be configured to generate spatial histograms on a periodic basis, asynchronously in relation to database requests, so that relatively updated spatial histograms 336 are available for query optimizer 324 when necessary. In some embodiments, spatial histogram creation component 326 creates spatial histograms 336 in response to triggers, such as database commands that update the data in spatial data sets, or explicit commands, such as a command from a database administrator to rebuild spatial indexes 337.

Spatial indexing component 327 is a component that computes spatial indexes, such as spatial indexes 337, from spatial data sets, such as spatial data sets 332, using conventional indexing techniques. Like spatial histogram creation component 326, spatial indexing component 327 may be configured to generate or refresh spatial indexes 337 periodically, in response to triggers, and/or in response to specific commands.

Database 330 stores at least one or more spatial data sets 332, one or more spatial indexes 337, and one or more spatial histograms 336. Database 330 may likewise store any of a variety of additional components, such as additional metadata, non-spatial data sets, and so forth.

Each spatial data set 332 is a set of related spatial data objects that exist within a common multidimensional space. Spatial data sets 332 may be stored in any suitable form, including as one or more relational tables. In an embodiment, each spatial data set 332 is stored as a separate set of one or more relational tables. A separate spatial histogram 336 and spatial index 337 may exist for each spatial data set 332, and/or some spatial histograms 336 and spatial indices 337 may span multiple spatial data sets 332.

Database 330 may be any database suitable for storing spatial data sets. In an embodiment, data repository 310 is little more than a storage system that communicates conventional data blocks to data server 320 via conventional I/O operations. In an embodiment, spatial data sets 332 are stored physically within database 330 as data block structures, but interpreted logically as tables of spatial data by server 320.

As a practical matter, the use of a computer system in claimed embodiments is required. For example, server 320 may be implemented by one or more computer systems executing collectively as a server. The components thereof may, for example, be implemented by one or more hardware processors of those one or more computer systems, configured to execute instructions for performing the various functions described herein. The techniques described herein should not be construed in any way as being amendable to being performed mentally or manually.

In some embodiments, server 320 lacks one or more of the depicted features. For example, server 320 may simply be configured to generate spatial histograms, and thus lack query optimizer 324 and query execution plans 325. As another example, spatial indexes 337 and/or spatial histograms 336 may be stored in memory at server 320.

System 300 is but one example of a system in which the described techniques may be practiced. Other systems may include fewer or additional components, in potentially varying arrangements.

3.0. Functional Overview

Figure 4:
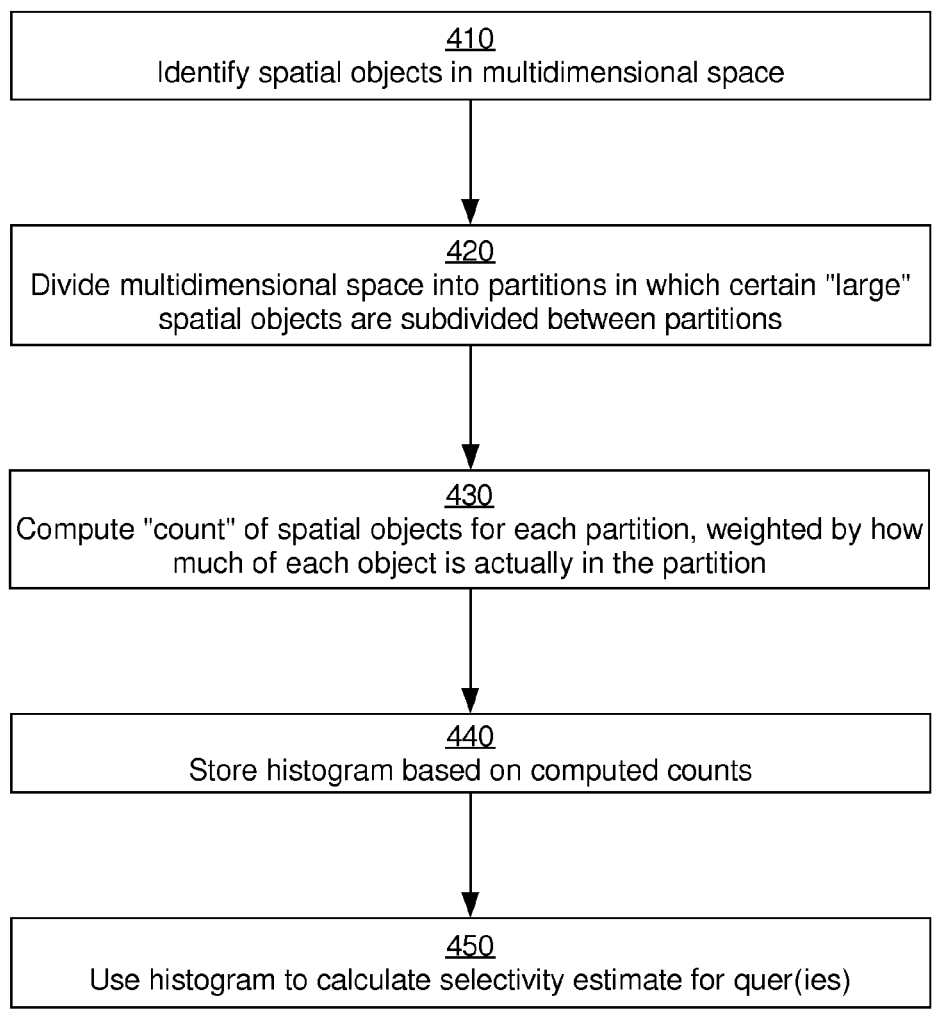
FIG. 4 is a flow diagram that illustrates a technique for constructing a histogram of spatial data.

FIG. 4 is a flow diagram 400 that illustrates a technique for constructing a histogram of spatial data, according to an embodiment. Flow diagram 400 may be performed, for example, by spatial histogram creation component 326, or any other component that needs to create a spatial histogram for spatial data.

Block 410 comprises identifying spatial objects in a multidimensional space. For example, spatial histogram creation component 326 may query database 330 to identify each spatial object in a particular spatial data set 332. Each of the spatial objects covers an extent of the multidimensional space.

Partitioning

Block 420 comprises dividing the multidimensional space into partitions (or "buckets"). Any of a variety of partitioning heuristics may be utilized to divide the space.

In embodiments, the partitioning heuristic involves determining boundaries for the partitions based on the extents of the spatial objects. The boundaries are determined, depending on the embodiment, based on the exact extents of the spatial objects, or based on bounding geometries that enclose the objects. The determining comprises dividing each particular spatial object in a first subset of the spatial objects into two or more weighted subobjects that have midpoints in different "sides" of the partitions.

In an embodiment, the spatial objects that are divided into subobjects (i.e. the first subset) comprises only large spatial objects, such as those spatial objects that are guaranteed to be larger than an average-sized partition. Thus, to identify which spatial objects are to be divided into subobjects, threshold dimension size(s) (e.g. width, heights, depth, etc.) are determined by identifying a target number of partitions, and then calculating the threshold dimension size(s) based at least in part on the dimensions of the multidimensional space and the target number of partitions. The spatial objects that are to be divided into weighted subobjects (i.e. the first subset) are then selected based at least in part on comparing the sizes of the spatial objects to the threshold dimension size(s).

In embodiments, a recursive partitioning heuristic, or similar, is utilized to determine the boundaries of the partitions. The multidimensional space is recursively subdivided until some threshold condition is reached. An initial bounding geometry of the multidimensional space (e.g. a bounding geometry covering all spatial objects in the spatial data set) serves as an initial partition. The initial partition is split into a set of two or more new partitions, and the initial partition is discarded. The new partitions are in turn split into sets of two or more new partitions, and then themselves discarded. The splitting process is repeated for each new partition, until a target number of partitions have been identified, or some other threshold condition is met. For instance, the threshold condition may be the creation of a target number of partitions. As another example, the threshold condition may be that each partition overlaps with no more or no less than a threshold number of objects. Other types of threshold conditions may also or instead be used.

Initially, all spatial objects are assigned, for counting purposes, to the initial partition. Whenever a particular partition is split, the spatial objects assigned to the particular partition are re-assigned to the new partitions that were created from the particular partition. Most spatial objects are assigned to new partitions based upon the mid-points of their extents or bounding geometries. However, a particular set of spatial objects, such as a set of large spatial objects that overlap multiple partitions of the two or more partitions, is assigned somewhat differently. Each particular spatial object in the particular set of spatial objects may be split into two or more weighted subobjects having midpoints in different partitions of the two or more partitions. These subobjects are assigned to different partitions. Since they are weighted, the subobjects confer only a fraction of a count to their respective partitions, the fraction corresponding to the weight assigned to the subobject. Subobjects may themselves be split into subobjects during subsequent iterations or recursions of dividing the multi-dimensional space, in which case the weight assigned to each newly formed subobject is a fraction of the weight assigned to the original subobject.

In an embodiment, an equi-count strategy is utilized to identify the extents of each new partition created during each recursion of subdividing the multidimensional space. Each time a particular partition is split, the particular partition is divided into two or more new partitions whose boundaries overlap approximately equally-sized subsets of the spatial objects. For example, a partition in a two-dimensional space may be divided into two sides which contain approximately equal numbers of object mid-points. In an embodiment, an equi-area strategy may instead be utilized to identify the extents of each partition during each iteration of subdividing the multidimensional space. Each time a particular partition is split, the particular partition is divided into two or more new partitions that have approximately equal areas. For example, a two-dimensional space may be divided into two sides of equal areas.

In an embodiment, after objects are assigned to new partitions, as discussed above, the extent of each partition may be expanded or contracted to a bounding geometry of all objects assigned to the partition. Depending on the embodiment, the partitions may or may not overlap.

In other embodiments, any number of partitions may be created, and any algorithm for identifying the extents of the partitions may be utilized. For example, the multidimensional space may be partitioned into equally sized partitions. More detailed examples of suitable partitioning techniques are described in subsequent sections.

Weighted Counting

Block 430 comprises, for each particular partition of the partitions, estimating a weighted count of how many of the spatial objects overlap with the particular partition. Block 430 more specifically comprises weighting the count of each particular spatial object in each particular partition by how much of the particular spatial object is actually within the particular partition. For example, spatial objects that are wholly within a particular partition may increase the count of the particular partition by one. Meanwhile, a spatial object that is not wholly within a particular partition may increase the count of the particular partition by a decimal that is equivalent to the percentage of the spatial object that is actually within the particular partition. Thus, a spatial object whose extent is only seventy-five percent within the particular partition would increase the count of the particular partition by 0.75. Of course, other counting and/or weighting techniques may instead be used.

In an embodiment, the weighting is based on exactly how much of the object's extent is within the partition. In an embodiment, a bounding geometry is identified for the object. The weighting is instead based on how much of the bounding geometry overlaps with the partition.

Thus, in accordance with block 430, estimating the count for a first particular partition comprises weighting each particular spatial object in a first subset of the spatial objects based on how much each particular spatial object overlaps with the first particular partition, wherein each particular spatial object in the first subset of the spatial objects only partially overlaps the first particular partition.

In embodiments involving recursive partitioning, if objects were assigned to new partitions at each level of recursion, weights may have already been associated with the subobjects assigned to a partition. Thus, the count of block 430 may be arrived at by simply adding the number of undivided objects assigned to a partition to the sum of the weights of all weighted subobjects assigned to the partition.

In an embodiment, subobjects are not weighted. Each object that overlaps with a partition contributes a same value to the count of a partition regardless of how much of the object resides in the partition. In an embodiment, not all objects begin with the same weight. For example, objects may also be weighted based on other metrics such as values associated with the objects and/or how frequently the objects are actually accessed.

Using the Histogram

Block 440 comprises storing a histogram describing the partitions and specifying the estimated count for each of the partitions. For example, spatial histogram creation component 326 may save a spatial histogram 336 to database 330. The histogram may be, for example, in the form of a table of rows, each row corresponding to a different partition. Each row may include one or more columns specifying the extent of a partition, along with a column containing a count for the partition. Any other suitable representation of a histogram may also be used. In an embodiment, the spatial histogram may furthermore be saved with a timestamp representing when it was created, so that, for example, query optimizer 324 or spatial histogram creation component 326 may decide when to recalculate the histogram.

At block 450, while creating and/or deciding upon a query plan to execute a spatial query, a query optimizer uses the histogram to calculate selectivity estimates for the spatial data set. For example, if the spatial data set is represented by a table in which each spatial object is specified by a different row of the table, and the query involves the table, the query optimizer may look for histogram partitions that overlap with an extent specified in the query. The query optimizer may then sum the counts of the overlapping partitions. This sum is the selectivity estimate (e.g. an estimate of the number of rows that will be returned) for the query relative to the table.

Flow 400 is but one example of a flow for practicing the techniques described herein. Other flows may include additional or fewer steps in potentially varying orders. For example, other flows may not involve blocks 440 and 450, but instead involve generating a visualization of the spatial data set based on the spatial histogram.

4.0. Implementation Examples 4.1. Partitioning with Subobjects

Figure 5:
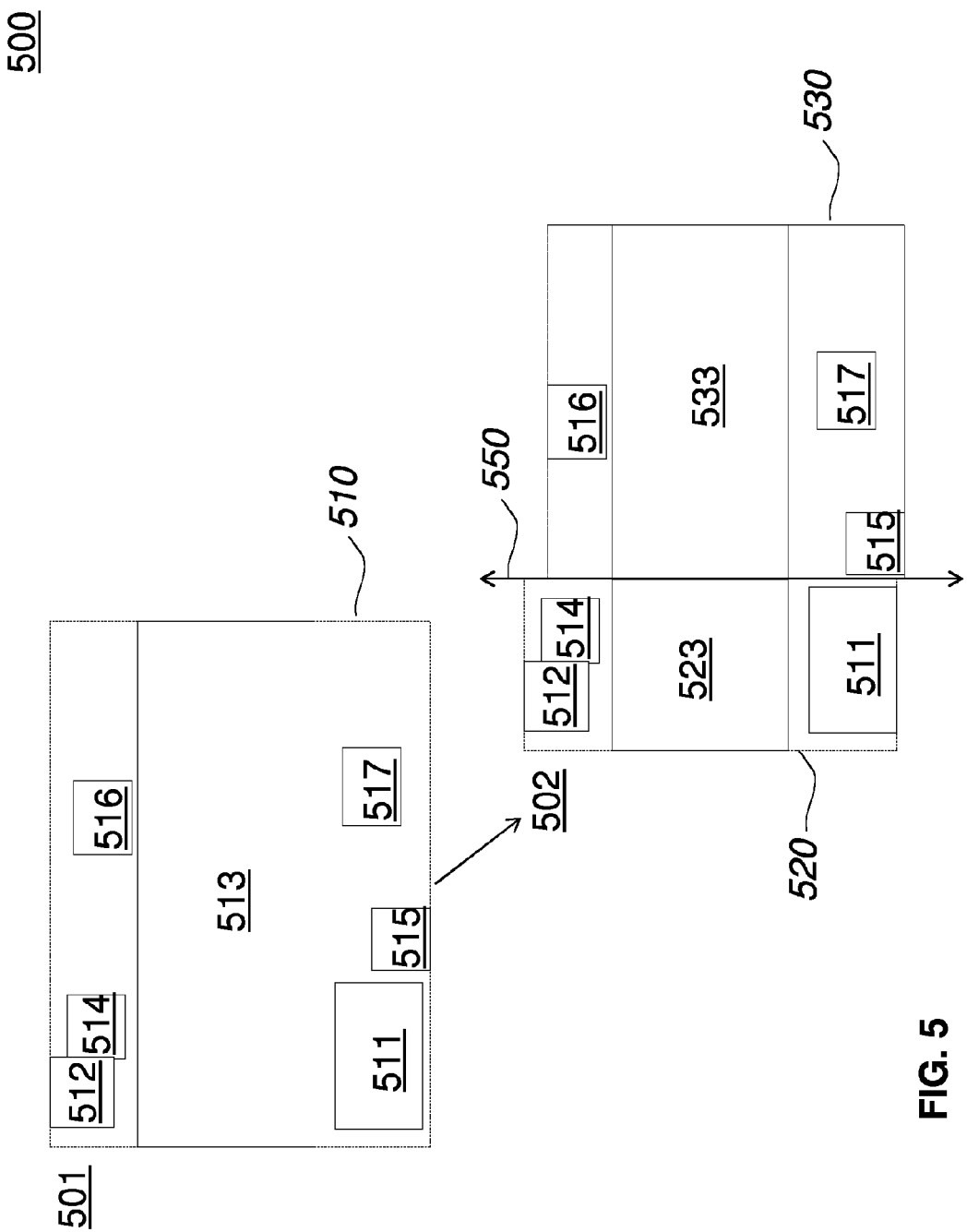
FIG. 5 is a block diagram that illustrates how a partition may be divided into two partitions when a large object has been divided into weighted subobjects.

FIG. 5 is a block diagram 500 that illustrates how a partition 510 may be divided into two partitions 520 and 530 when a large object 513 has been divided into weighted subobjects 523 and 533. Initial partition 510, as illustrated in block 501, comprises objects 511-517, of which object 513 is significantly large, and in fact fills the entire width of partition 510.

When dividing partition 510, objects 511-517 are evaluated to determine whether any of the objects meet a threshold condition to be considered a large object, such as having bounding geometries that are larger than a threshold dimension size. In this case, object 513 meets the threshold condition. Object 513 is thus considered to be a large object and is therefore "splittable" if it overlaps two partitions.

In the illustrated embodiment, the objects in initial partition 510 are divided according to an equi-count heuristic, thus resulting in the dividing line 550 illustrated by block 502. For purposes of determining the location of dividing line 550 under some equi-count heuristics, large objects such as object 513 may have been ignored, depending on whether it was possible to divide partition 510 into approximately equal-count subpartitions without dividing object 513.

As further illustrated by block 502, objects 511, 512, and 514 are assigned to the left side of dividing line 550, while objects 515-517 are assigned to the right side of dividing line 550. Finally, object 513 is split into two weighted subobjects 523 and 533 along dividing line 550. Subobject 523 is assigned to the left side, while subobject 533 is assigned to the right side. Partitions 520 and 530 are then formed by finding bounding geometries for all objects (and subobjects) assigned to the left side of dividing line 550 and all objects (and subobjects) assigned to the right side of dividing line 550, respectfully.

In an embodiment, each of objects 511-517 is assigned a weight, which may have been a default value such as 1 if the object had never been split, or a fraction of the default value if the object was a weighted subobject from a previous split. The weight of most of objects 511-517 will remain unchanged as a result of the division. However, the weight assigned to object 513 is divided proportionally amongst subobjects 523 and 533 relative to the size of object 513. A "count" of the objects in each of partitions 510, 520, and 530 is the sum of the weights of the objects in the respective partitions. For example, assuming all objects initially had a weight of 1, and that subobject 523 is 0.3 times the size of object 513, the count of partition 510 would be 7, the count of partition 520 would be 3.3, and the count of partition 530 would be 3.7. Thus, the counts associated with partitions 520 and 530 are based at least partly on the extent to which large objects such as object 513 overlaps partitions 520 and 530.

Partition 510, depending on the embodiment, may or may not be discarded after the division has been accomplished. However, partition 510 will not be divided again.

Block diagram 500 is but one example of how partition 510 may divided. Many other divisions are also possible. For example, dividing line 550 may be placed in different locations with potentially different orientations depending on the exact equi-count or equi-area heuristic used. There may be multiple dividing lines 550, for example, to divide partition 510 into three or more partitions at a time. In embodiments, smaller objects may straddle dividing line 550 and be assigned to one of the sides without being split. In some of these embodiments, object 513 may be split along a partition boundary rather than the dividing line 550, since there may be some overlap in the partitions. Depending on the implementation, subobjects 523 and 533 may or may not possess some overlap in such cases.

Block diagram illustrates an embodiment in a two-dimensional space with bounding geometries that are minimum bounding rectangles. However, the depicted techniques are extensible to multidimensional spaces of any size, and any suitable bounding geometries may be utilized.

4.2. Example Equi-Area Partitioning

Figure 6:
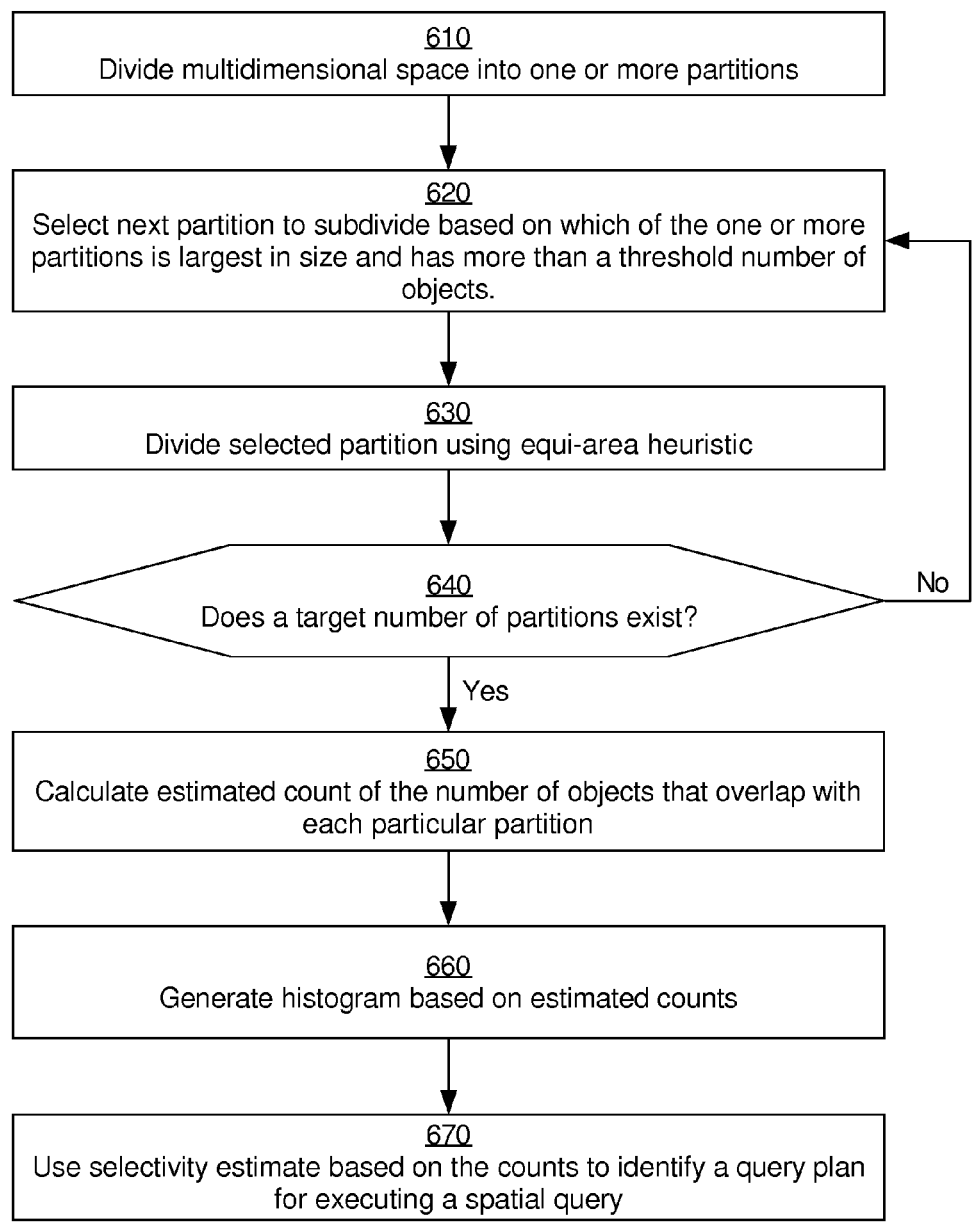
FIG. 6 is a flow diagram that illustrates a more detailed technique for constructing a histogram of spatial data using an equi-area heuristic.

FIG. 6 is a flow diagram 600 that illustrates a more detailed technique for constructing a histogram of spatial data using an equi-area heuristic, according to an embodiment.

Block 610 comprises dividing a multidimensional space into a set of one or more partitions. For example, a particular spatial data set 332 may be divided into two or more equi-area partitions.

Block 620 comprises selecting a particular partition, from the set of one or more partitions, to subdivide. The selected particular partition has a largest size among partitions, in the set of one or more partitions, that overlap with more than a threshold number of spatial objects. Thus, even if a partition is the largest remaining partition, the partition will not be selected unless it has more than a threshold number of spatial objects. The threshold number may be any suitable number. For example, the threshold number may be a function of the total number of objects in the multidimensional space divided by the target number of partitions into which the multidimensional space is to be divided.

At block 630, the particular partition selected in block 620 is divided into multiple partitions using an equi-area heuristic. The particular partition is then removed from the set of one or more partitions and replaced with the newly formed multiple partitions.

Block 640 comprises determining whether the set of one or more partitions includes a target number of partitions. If not, flow returns to block 620, thus repeating at least the steps of selecting a particular partition and splitting the particular partition with respect to different partitions in the set of one or more partitions. If the set of one or more partitions includes a target number of partitions, flow proceeds to block 650.

Block 650 comprises calculating, for each particular partition of the set of one or more partitions, an estimated count of spatial objects that overlap with the particular partition. For example, each spatial object that overlaps with a partition may increase the count of the partition by one.

Block 660 comprises generating a histogram that indicates, for each particular partition of the set of one or more partitions, the previously calculated estimated count of spatial objects that overlap with the particular partition.

Block 670 comprises using a selectivity estimate based on the estimated counts in the histogram to identify a query plan for executing a database query involving spatial objects in the multidimensional space, as discussed elsewhere in this application.

Flow 600 is but one example of a flow for practicing the techniques described herein. Other flows may include additional or fewer steps in potentially varying orders. For example, other flows may not involve block 670, but instead involve generating a visualization of the spatial data set based on the histogram.

As another example, in an embodiment, the division of block 630 may involve dividing large objects into weighted subobjects. Thus, upon splitting a first particular partition into a first set of multiple partitions, block 630 may involve splitting a first set of spatial objects that overlap with two or more partitions in the first set of partitions into multiple spatial objects that are assigned weights based on size relative to each other, each of the multiple spatial objects residing entirely within a different partition of the multiple partitions. Block 650 may then comprise calculating the estimated counts based in part on the assigned weights In some embodiments, performance of block 620 may facilitate improved partitioning of a multi-dimensional space even without dividing objects into weighted subobjects in block 630. By the same token, in some embodiments where block 630 comprises dividing large objects into weighted subobjects, block 620 may be optional.

4.3. Example Equi-Count Partitioning

Figure 7:
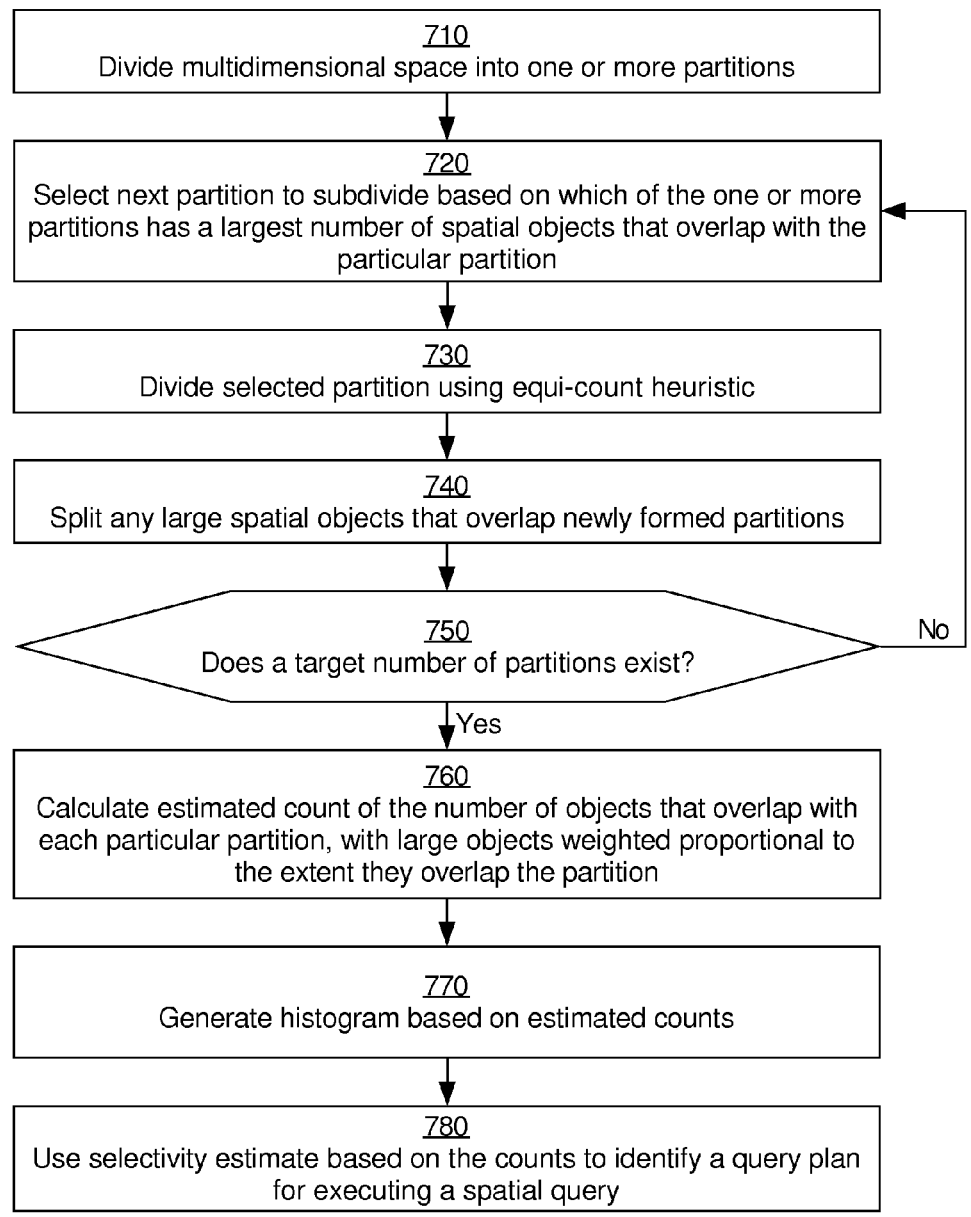
FIG. 7 is a flow diagram that illustrates a more detailed technique for constructing a histogram of spatial data using an equi-count heuristic.

FIG. 7 is a flow diagram 700 that illustrates a more detailed technique for constructing a histogram of spatial data using an equi-count heuristic, according to an embodiment.

Block 710 comprises dividing a multidimensional space into a set of one or more partitions. For example, a particular spatial data set 332 may be divided into two or more equi-count partitions.

Block 720 comprises selecting a particular partition, from the set of one or more partitions, to subdivide. The selected particular partition has a largest number of spatial objects that overlap with the particular partition out of the set of one or more partitions.

At block 730, the particular partition selected in block 720 is divided into multiple partitions using an equi-count heuristic, as described elsewhere in this application. The particular partition is then removed from the set of one or more partitions and replaced with the newly divided multiple partitions.

Block 740 comprises splitting each spatial object, of a first set of spatial objects that overlap with two or more partitions in the multiple partitions, into multiple spatial objects. For example, each spatial object in a set of large spatial objects may be divided into smaller spatial objects. Each of the multiple spatial objects generated from dividing a spatial object resides entirely within a different partition of the multiple partitions. In an embodiment, each of the multiple spatial objects generated from dividing a spatial object is assigned a weight based on size relative to each other.

Block 750 comprises determining whether the set of one or more partitions includes a target number of partitions. If not, flow returns to block 720, thus repeating at least the steps of selecting a particular partition and splitting the particular partition with respect to different partitions in the set of one or more partitions. If the set of one or more partitions includes a target number of partitions, flow proceeds to block 760.

Block 760 comprises calculating, for each particular partition of the set of one or more partitions, an estimated count of spatial objects that overlap with the particular partition. For example, each spatial object that overlaps with a partition may increase the count of the partition by one. In an embodiment, estimated counts are based in part on weights assigned in block 740.

Block 770 comprises generating a histogram that indicates, for each particular partition of the set of one or more partitions, the previously calculated estimated count of spatial objects that overlap with the particular partition.

Block 780 comprises using the estimated counts in the histogram to identify a query plan for executing a database query involving spatial objects in the multidimensional space, as discussed elsewhere in this application.

Flow 700 is but one example of a flow for practicing the techniques described herein. Other flows may include additional or fewer steps in potentially varying orders. For example, other flows may not involve block 780, but instead involve generating a visualization of the spatial data set based on the histogram.

4.4. Example Detailed Process Flow

The above techniques and process flows may be implemented in a variety of ways. A more detailed example of one such implementation is as follows.

A histogram generating component creates a working repository of spatial objects. For example, the working repository may be a temporary copy of a table containing the spatial objects, with extra columns for metadata such as partition identifiers or weights. The working repository need not necessarily include a complete copy of each spatial object—for example, the working repository may simply contain data defining the extent of a bounding geometry for each spatial object.

Initial weights, such as a default weight of 1, are assigned to all spatial objects in the working repository. An extent for an initial partition is identified. The extent is simply a bounding geometry for all spatial objects in the working repository, such as a maximum extent for the multidimensional space, or a rectangle having vertices corresponding to the minimum and maximum x and y coordinates for all spatial objects in the working repository. A repository of partitions is then created, such as a table that maps partition identifiers to corresponding extents. The repository of partitions initially includes only the initial partition.

A terminal condition is identified. The terminal condition may be, for example, a target number of partitions, a target maximum size for each partition, an elapsed amount of time for executing the process flow, a maximum level of recursion, a maximum size of memory utilization, a target maximum number of spatial objects assigned to each partition, and so on. The terminal condition may have been specified by a database administrator or calculated based at least partly on data concerning the multidimensional space and/or available system resources.

The histogram generation component then begins a loop. First, a working partition is identified. Although any heuristic for selecting a working partition may be used, in an embodiment, the working partition may be identified based on the extents of the existing partitions in repository of partitions (e.g. the maximum sized partition). The working partition may also or instead be identified based on the number of spatial objects assigned to each partition (e.g. the partition to which a maximum number, or more than a threshold number, of objects has been assigned) or the current weighted count of each partition. The working partition may also or instead be selected based on when it was generated (e.g. the partition that was generated longest ago). To facilitate selection of the working partition, the repository of partitions may be organized in a queue, stack, or other suitable structure, which may or may not be sorted based on the above factors.

Threshold "large object" dimension size(s) are identified using any suitable technique. The threshold dimension size(s) will be used for determining when an object may be split. The threshold dimension size(s) may be, for example, the expected average partition width and/or height, given a target number of partitions. For instance, a threshold width may be the width of the initial partition, divided by the target number of partitions. Or, a threshold width may be the width of the working partition divided by the number partitions into which the working partition is to be divided. As another example, default sizes may have been specified. As another example, the threshold dimension size(s) may be calculated based on statistical functions of the sizes of the extents of each spatial object in the working repository. The threshold dimension size(s) may be determined once for all iterations of the loop, or they may recalculated during various iterations of the loop.

Using the threshold "large object" sizes, a set of large spatial objects that are assigned to the working partition are identified. Alternatively, spatial objects may be flagged as "large" prior to entering the loop.

The working partition is then divided into buckets ("sides") based on an appropriate heuristic. For example, using an equi-area heuristic, the working partition may be split into two buckets down the middle of its longest edge. As another example, the working partition may be divided along a line, plane, etc., selected so as to ensure that an approximately equal number of objects (or weighted count) is assigned to each bucket. In some embodiments, large objects are always ignored for the purposes of dividing the working partition using an equi-count heuristic. In some embodiments, large objects are ignored if necessary to arrive at approximately equi-count buckets. Depending on the heuristic implementation, more than two buckets may be generated.

The buckets ("sides") then become new partitions that are added to the repository of partitions, along with data identifying each bucket's extent. Optionally, each bucket's extent may be expanded and/or contracted to that of a minimum bounding geometry for all objects assigned to the bucket. The working partition is removed from the repository of partitions. The objects previously assigned to the working partition are reassigned to one of the new partitions, based on the locations of the mid-points of their bounding geometries.

Any large objects that overlap with more than one of the new partitions are divided into two or more new objects along the boundaries of the buckets (or partitions). The working repository of objects is updated to remove the original large object and include the new objects. Weights are assigned to the new objects by dividing the weight assigned to the original large object amongst the new objects proportionally.

This loop then repeats until the terminal condition is met. Once the terminal condition is met, a count is calculated for each partition in the repository of partitions by summing the weights of the objects assigned to the partition. Alternatively, a count for each partition may be calculated at the time it is formed during the loop. The repository of partitions, along with the counts, forms a spatial histogram.

4.5. Database-Specific Implementation Example

Another example implementation of techniques described above, specific to an implementation involving an Oracle database, is as follows. An Oracle R-tree index is created for a spatial data table for fast histogram construction. The leaf level nodes for an Oracle R-tree contain the minimum bounding rectangle (MBR) and the ROWID for each spatial geometry object. Since the spatial geometry object MBRs stored in the R-tree leaf nodes are used for bucket creation, no rows need to be retrieved from the spatial tables.

All leaf level nodes are retrieved from the R-tree index. The MBR and weight W for each geometry object is stored as an MBRnode object with a pointer to another MBRnode object. W is assigned a value of 1 initially for each geometry object, indicating it fully belongs to this bucket.

The set of MBRnodes is stored as a single linked list which constitutes the first bucket. The addition of MBRnodes to the linked list also involves computation of the MBR for the bucket. This is simply the MBR which encloses the MBRs of each of the MBRnodes. The average width $W_{avg}$ and average height $H_{avg}$ are computed for the final set of buckets, assuming that the desired number of buckets N is obtained by iteratively splitting this bucket. The average number of objects $N_{avg}$ in each final bucket as $N_{avg}=|MBRnodes|/N$ is also computed.

The bucket is next split according to either equi-area, equi-count, or any other suitable heuristic. Only buckets which contain at least $x*N_{avg}$ objects (x<1) are considered for splitting. This is to prevent too many splits for a bucket which already contains a small number of objects, as this bucket is expected to cause low relative errors in selectivity estimation. The linked list which constitutes a bucket is traversed. For each MBRnode, a width $W_{node}$ and height $H_{node}$ is obtained. The MBRnode is assigned to one of the two newly formed buckets based on which bucket contains the center of its MBR. After assignment of all the geometry objects to one of the two newly formed buckets, the bucket MBRs for the new buckets is recomputed to ensure tightness as well as the enclosure of all contained geometry MBRs. This step may lead to the formation of buckets with large MBRs if one or more contained objects have large MBRs. On the other hand, the MBRs are not recomputed and allowed to be half the size of the original bucket's MBR, the new bucket's MBR may be unnecessarily larger.

The formation of buckets with unnecessarily large MBRs is avoided by splitting large geometry MBRs. Geometries for which $W_{node}>W_{avg}$ or $H_{node}>H_{avg}$ are determined. For such geometries, if the geometry MBR is fully contained in one of the two halves representing the newly formed buckets, no additional processing is necessary. However, if the geometry MBR is spread across both buckets, the geometry MBR is split, allowing it to be shared between the two buckets with weights $W_1$ and $W_2$ equivalent to the fraction of the original MBR area contained within each bucket. $W_1$ and $W_2$ are the weights for the objects in the two newly formed buckets with $W_1+W_2=W_p$, where $W_p$ is the weight of the geometry MBR in the parent bucket. This prevents the MBR recomputation step from resulting in large bucket MBRs.

Once the desired number of buckets N are obtained, the weights of all the MBRnodes belonging to the bucket are summed, as an estimate of the number of geometry objects belonging to the bucket.

5.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

6.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
identifying spatial objects in an multidimensional space, each of the spatial objects covering an extent of the multidimensional space;
dividing the multidimensional space into partitions;
for each particular partition of the partitions, estimating a weighted count of how many of the spatial objects overlap with the particular partition;
wherein estimating the weighted count for a first particular partition comprises weighting each particular spatial object in a first subset of the spatial objects proportionate to how much each particular spatial object overlaps with the first particular partition, wherein the each particular spatial object in the first subset of the spatial objects only partially overlaps the first particular partition;
wherein the method is performed by one or more computing devices.

2. The method of claim 1, further comprising:
dividing each particular spatial object in the first subset of the spatial objects into two or more weighted subobjects that have midpoints in different partitions of the partitions.

3. The method of claim 2, further comprising:
identifying a target number of partitions;
calculating a threshold dimension size based at least in part on the size of the multidimensional space and the target number of partitions;
selecting which of the spatial objects to divide into weighted subobjects based at least in part on comparing the sizes of the spatial objects to the threshold dimension size.

4. The method of claim 1, further comprising:
for each object of the spatial objects, identifying a bounding geometry that encloses the object;
determining boundaries for the partitions based upon the bounding geometries.

5. The method of claim 1, further comprising:
for each object of the spatial objects, identifying a bounding geometry that encloses the object;
wherein estimating a count of how many of the spatial objects overlap with the particular partition comprises identifying how many of the objects have bounding geometries that overlap with the particular partition;
wherein weighting each particular spatial object in the first subset of the spatial objects proportionate to how much each particular spatial object overlaps with the first particular partition comprises weighting each particular spatial object by what percentage of the bounding geometry for the particular spatial object overlaps with the particular partition.

6. The method of claim 1, wherein dividing the multidimensional space into the partitions comprises:
splitting an initial partition into a set of partitions; and
recursively splitting each particular partition in the set of partitions into additional partitions until a target number of partitions have been identified;
wherein splitting each particular partition comprises:
splitting the particular partition into two or more partitions whose boundaries overlap approximately equally-sized subsets of the spatial objects; and
identifying a particular set of spatial objects that overlap multiple partitions of the two or more partitions;
splitting each particular spatial object in the particular set of spatial objects into two or more weighted subobjects having midpoints in different partitions of the two or more partitions.

7. The method of claim 1, wherein dividing the multidimensional space into the partitions comprises:
splitting an initial partition into a set of partitions; and
recursively splitting each particular partition in the set of partitions into approximately equally-sized additional partitions until a target number of partitions have been identified;
wherein recursively splitting each particular partition comprises determining whether to recursively split a second particular partition of the equally-sized additional partitions based on how many of the spatial objects overlap the second particular partition.

8. The method of claim 1, further comprising:
storing a histogram describing the partitions and specifying the estimated count for each of the partitions;
using, by a query optimizer that is compiling a query, the histogram to calculate selectivity estimates for a table in which the spatial objects are stored;
wherein each of the spatial objects is specified by a different row of the table.

9. A method comprising:
dividing a multidimensional space into a set of one or more partitions;
selecting a particular partition from the set of one or more partitions, based on the particular partition having a largest size among partitions in the set of one or more partitions that overlap with more than a threshold number of spatial objects;

splitting the particular partition into multiple partitions and replacing the particular partition in the set of one or more partitions with the multiple partitions;

repeating at least the steps of selecting a particular partition and splitting the particular partition with respect to different partitions in the set of one or more partitions, until the set of one or more partitions includes a target number of partitions;

generating a histogram that indicates, for each particular partition of the set of one or more partitions, an estimated count of spatial objects that overlap with the particular partition;

using the estimated counts in the histogram to identify a query plan for executing a database query involving spatial objects in the multidimensional space;

wherein the method is performed by one or more computing devices.

10. The method of claim 9, further comprising:

upon splitting a first particular partition into a first set of multiple partitions, splitting a first set of spatial objects that overlap with two or more partitions in the first set of partitions into multiple spatial objects that are assigned weights based on size relative to each other, each of the multiple spatial objects residing entirely within a different partition of the multiple partitions;

calculating the estimated counts based in part on the assigned weights.

11. A method comprising:

dividing a multidimensional space into a set of one or more partitions;

selecting a particular partition from the set of one or more partitions, based on the particular partition having a largest number of spatial objects that overlap with the particular partition;

splitting the particular partition into multiple partitions and replacing the particular partition in the set of one or more partitions with the multiple partitions;

splitting each spatial object, in a first set of spatial objects that overlap with two or more partitions in the multiple partitions, into multiple spatial objects that are assigned weights based on size relative to each other, each of the multiple spatial objects residing entirely within a different partition of the multiple partitions;

repeating at least the steps of selecting a particular partition and splitting the particular partition with respect to different partitions in the set of one or more partitions, until the set of one or more partitions includes a target number of partitions;

generating a histogram that indicates, for each particular partition of the set of one or more partitions, an estimated count of spatial objects that overlap with the particular partition, wherein the estimated counts are based in part on the assigned weights;

using the estimated counts in the histogram to identify a query plan for executing a database query involving spatial objects in the multidimensional space;

wherein the method is performed by one or more computing devices.

12. One or more non-transitory media storing instructions which, when executed by one or more computing devices, cause performance of:

identifying spatial objects in an multidimensional space, each of the spatial objects covering an extent of the multidimensional space;

dividing the multidimensional space into partitions;

for each particular partition of the partitions, estimating a weighted count of how many of the spatial objects overlap with the particular partition;

wherein estimating the weighted count for a first particular partition comprises weighting each particular spatial object in a first subset of the spatial objects proportionate to how much each particular spatial object overlaps with the first particular partition, wherein the each particular spatial object in the first subset of the spatial objects only partially overlaps the first particular partition.

13. The one or more non-transitory media of claim 12, wherein the instructions, when executed by the one or more computing devices, further cause performance of dividing each particular spatial object in the first subset of the spatial objects into two or more weighted subobjects that have midpoints in different partitions of the partitions.

14. The one or more non-transitory media of claim 13, wherein the instructions, when executed by the one or more computing devices, further cause performance of:

identifying a target number of partitions;

calculating a threshold dimension size based at least in part on the size of the multidimensional space and the target number of partitions;

selecting which of the spatial objects to divide into weighted subobjects based at least in part on comparing the sizes of the spatial objects to the threshold dimension size.

15. The one or more non-transitory media of claim 12, wherein the instructions, when executed by the one or more computing devices, further cause performance of:

for each object of the spatial objects, identifying a bounding geometry that encloses the object;

determining boundaries for the partitions based upon the bounding geometries.

16. The one or more non-transitory media of claim 12, wherein the instructions, when executed by the one or more computing devices, further cause performance of:

for each object of the spatial objects, identifying a bounding geometry that encloses the object;

wherein estimating a count of how many of the spatial objects overlap with the particular partition comprises identifying how many of the objects have bounding geometries that overlap with the particular partition;

wherein weighting each particular spatial object in the first subset of the spatial objects proportionate to how much each particular spatial object overlaps with the first particular partition comprises weighting each particular spatial object by what percentage of the bounding geometry for the particular spatial object overlaps with the particular partition.

17. The one or more non-transitory media of claim 12, wherein dividing the multidimensional space into the partitions comprises:

splitting an initial partition into a set of partitions; and recursively splitting each particular partition in the set of partitions into additional partitions until a target number of partitions have been identified;

wherein splitting each particular partition comprises:

splitting the particular partition into two or more partitions whose boundaries overlap approximately equally-sized subsets of the spatial objects; and identifying a particular set of spatial objects that overlap multiple partitions of the two or more partitions;

splitting each particular spatial object in the particular set of spatial objects into two or more weighted sub-objects having midpoints in different partitions of the two or more partitions.

18. The one or more non-transitory media of claim 12, wherein dividing the multidimensional space into the partitions comprises:
   splitting an initial partition into a set of partitions; and
   recursively splitting each particular partition in the set of partitions into approximately equally-sized additional partitions until a target number of partitions have been identified;
   wherein recursively splitting each particular partition comprises determining whether to recursively split a second particular partition of the equally-sized additional partitions based on how many of the spatial objects overlap the second particular partition.

19. The one or more non-transitory media of claim 12, wherein the instructions, when executed by the one or more computing devices, further cause performance of:
   storing a histogram describing the partitions and specifying the estimated count for each of the partitions;
   using, by a query optimizer that is compiling a query, the histogram to calculate selectivity estimates for a table in which the spatial objects are stored;
   wherein each of the spatial objects is specified by a different row of the table.

20. One or more non-transitory media storing instructions which, when executed by one or more computing devices, cause performance of:
   dividing a multidimensional space into a set of one or more partitions;
   selecting a particular partition from the set of one or more partitions, based on the particular partition having a largest size among partitions in the set of one or more partitions that overlap with more than a threshold number of spatial objects;
   splitting the particular partition into multiple partitions and replacing the particular partition in the set of one or more partitions with the multiple partitions;
   repeating at least the steps of selecting a particular partition and splitting the particular partition with respect to different partitions in the set of one or more partitions, until the set of one or more partitions includes a target number of partitions;
   generating a histogram that indicates, for each particular partition of the set of one or more partitions, an estimated count of spatial objects that overlap with the particular partition;
   using the estimated counts in the histogram to identify a query plan for executing a database query involving spatial objects in the multidimensional space.

21. The one or more non-transitory media of claim 20, wherein the instructions, when executed by the one or more computing devices, further cause performance of:
   upon splitting a first particular partition into a first set of multiple partitions, splitting a first set of spatial objects that overlap with two or more partitions in the first set of partitions into multiple spatial objects that are assigned weights based on size relative to each other, each of the multiple spatial objects residing entirely within a different partition of the multiple partitions;
   calculating the estimated counts based in part on the assigned weights.

22. One or more non-transitory media storing instructions which, when executed by one or more computing devices, cause performance of:
   dividing a multidimensional space into a set of one or more partitions;
   selecting a particular partition from the set of one or more partitions, based on the particular partition having a largest number of spatial objects that overlap with the particular partition;
   splitting the particular partition into multiple partitions and replacing the particular partition in the set of one or more partitions with the multiple partitions;
   splitting each spatial object, in a first set of spatial objects that overlap with two or more partitions in the multiple partitions, into multiple spatial objects that are assigned weights based on size relative to each other, each of the multiple spatial objects residing entirely within a different partition of the multiple partitions;
   repeating at least the steps of selecting a particular partition and splitting the particular partition with respect to different partitions in the set of one or more partitions, until the set of one or more partitions includes a target number of partitions;
   generating a histogram that indicates, for each particular partition of the set of one or more partitions, an estimated count of spatial objects that overlap with the particular partition, wherein the estimated counts are based in part on the assigned weights;
   using the estimated counts in the histogram to identify a query plan for executing a database query involving spatial objects in the multidimensional space.

\* \* \* \* \*

UNITED STATES PATENT AND TRADEMARK OFFICE
CERTIFICATE OF CORRECTION

Page 1 of 1

PATENT NO. : 8,812,488 B2
APPLICATION NO. : 13/587897
DATED : August 19, 2014
INVENTOR(S) : Bamba et al.

It is certified that error appears in the above-identified patent and that said Letters Patent is hereby corrected as shown below:

In the Specification

In column 11, line 46, delete "weights" and insert -- weights. --, therefor.

Signed and Sealed this
Tenth Day of March, 2015

Michelle K. Lee
*Deputy Director of the United States Patent and Trademark Office*